(12) United States Patent
Shojania et al.

(10) Patent No.: US 9,055,010 B2
(45) Date of Patent: Jun. 9, 2015

(54) REFRESHING BLOCKED MEDIA PACKETS FOR A STREAMING MEDIA SESSION OVER A WIRELESS NETWORK IN A STALL CONDITION

(71) Applicant: Apple Inc., Cupertino, CA (US)

(72) Inventors: Hassan Shojania, Mountain View, CA (US); Nirav R. Patel, Cupertino, CA (US); Hyeonkuk Jeong, Saratoga, CA (US); Yan Yang, San Jose, CA (US); Roberto Garcia, Sunnyvale, CA (US); Sundararaman V. Shiva, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 14/018,344

(22) Filed: Sep. 4, 2013

(65) Prior Publication Data

US 2014/0064299 A1    Mar. 6, 2014

Related U.S. Application Data

(60) Provisional application No. 61/696,795, filed on Sep. 4, 2012.

(51) Int. Cl.
*H04L 12/56* (2006.01)
*H04L 12/861* (2013.01)
*H04L 12/841* (2013.01)
*H04L 12/823* (2013.01)
*H04L 29/06* (2006.01)
*H04L 12/853* (2013.01)

(52) U.S. Cl.
CPC ............. *H04L 49/90* (2013.01); *H04L 47/2416* (2013.01); *H04L 47/28* (2013.01); *H04L 47/32* (2013.01); *H04L 65/4084* (2013.01); *H04L 65/80* (2013.01)

(58) Field of Classification Search
CPC ............................. H04L 49/90; H04L 47/2416
USPC ......................................................... 370/412
See application file for complete search history.

(56) References Cited

U.S. PATENT DOCUMENTS

| 7,315,515 | B2 | 1/2008 | Pazos |
| 7,646,781 | B2 | 1/2010 | Campion et al. |
| 7,843,818 | B2* | 11/2010 | Chu et al. ........................ 370/230 |
| 7,969,997 | B1* | 6/2011 | Noh et al. ...................... 370/408 |
| 8,285,886 | B1* | 10/2012 | Vass ................................. 710/15 |

* cited by examiner

*Primary Examiner* — Wanda Z Russell
(74) *Attorney, Agent, or Firm* — Downey Brand LLP

(57) ABSTRACT

A method for refreshing blocked media packets for a streaming media session over a wireless network in a stall condition is disclosed. The method can include a wireless communication device maintaining a buffer at an application layer. The buffer can contain at least a portion of media packets provided to a baseband layer by the application layer for transmission. Media packets provided to the baseband layer can be queued in a baseband queue prior to transmission. The method can further include the wireless communication device generating at least one new media packet for the streaming media session during the stall condition; flushing at least a portion of the media packets queued in the baseband queue; and replenishing the baseband queue by providing the baseband layer with at least a portion of the media packets contained in the buffer and at least one new media packet.

20 Claims, 8 Drawing Sheets

REFRESHING BLOCKED MEDIA PACKETS FOR A STREAMING MEDIA SESSION OVER A WIRELESS NETWORK IN A STALL CONDITION

CROSS-REFERENCE TO RELATED APPLICATIONS

This application claims priority to U.S. Provisional Patent Application No. 61/696,795, filed on Sep. 4, 2012, which is incorporated herein in its entirety by reference.

FIELD OF THE DESCRIBED EMBODIMENTS

The described embodiments relate generally to wireless communications and more particularly to refreshing blocked media packets for a streaming media session over a wireless network in a stall condition.

BACKGROUND

Media streaming applications that stream media data from a wireless communication device over a wireless network can suffer from stall conditions in which media packets become stalled in a baseband queue and cannot be transmitted from the wireless communication device. Stall conditions can result from a number of causes, including, for example, degrading channel conditions. As another example, in some instances, a stall condition can result from a transmitter having an insufficient transfer allowance, which prevents the transmitter from sending out data.

Stall conditions can occur rather frequently and, in some instances, can be quite lengthy. In the case of stall conditions having a relatively long duration, media packets queued for transmission in a streaming media session can be blocked in the baseband queue for an extended period of time. By the time the wireless network interface recovers from the stall, media packets released from the baseband queue and sent by the device can be old and of little use to the receiving end of the connection. As such, transmission of the old media packets can waste wireless bandwidth and require unnecessary processing/filtering overhead at the receiving end. Further, a device receiving old media packets can treat the late arrival of old packets following a stall as high end-to-end delay, or Round Trip Time (RTT), for the streaming media session even though the stall condition has already passed. If the receiving device treats the late arrival of old packets as high end-to-end delay for the streaming media session, rate control mechanisms can be triggered which can lead to a rapid ramp down and slow ramp up of the streaming rate. Since the stall condition has already passed at this point, implementation of the rate control mechanism can needlessly slow the steaming rate, thus negatively impacting user experience.

BRIEF SUMMARY OF SOME DISCLOSED EMBODIMENTS

Some example embodiments provide for refreshing blocked media packets for a streaming media session over a wireless network in a stall condition. In this regard, a wireless communication device in accordance with some example embodiments can be configured to continue to generate new media packets for the streaming media session during the stall condition. The wireless communication device of such example embodiments can be further configured to flush at least a portion of media packets queued in a baseband queue for transmission in the streaming media session during the stall condition. One or more of the oldest flushed media packets can be replaced with one or more new media packets generated during the stall condition, which have not been previously provided to the baseband layer. Accordingly, transmission of old media packets following recovery from the stall condition can be avoided. As such, a device receiving packets transmitted for a streaming media session in accordance with such example embodiments will not calculate RTT based on old packets, thus avoiding needlessly triggering rate control mechanisms and improving user experience. Moreover such example embodiments can reduce processing overhead at a transmitting device by avoiding transmission of old media packets following recovery from the stall condition. Further, processing overhead can be reduced at a receiving device, as the receiving device does not have to process and filter older packets that are no longer useful. Additionally, such example embodiments can benefit network operators due to a reduced amount of data being transmitted over the network.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Some embodiments disclosed herein provide for refreshing blocked media packets for a streaming media session over a wireless network in a stall condition. More particularly, some example embodiments provide for refreshing stalled media packets by flushing at least a portion of media packets queued in a baseband queue during a stall condition and replacing at least some of the flushed media packets with newer packets that have been generated during the stall condition. Some example embodiments utilize an application layer buffer to store copies of media packets previously provided to the baseband layer, some of which can be provided to the baseband layer for replenishing the baseband queue along with one or more new packets after the baseband queue has been flushed so that the baseband queue can be replenished with enough media packets to satisfy a threshold minimum amount of packets to keep in the baseband queue. This threshold minimum amount can be an amount of packets sufficient to support a transmission rate quickly recovering to support the media streaming application's target streaming rate following recovery from the stall condition.

As such, some example embodiments avoid transmission of old media packets following recovery from a stall condition by flushing older packets from the baseband queue and replacing the older packets with newer packets. Since the older packets that are flushed and discarded from the baseband queue may not be sent following recovery from the stall condition, a device receiving streamed packets does not have to process and filter older packets, thus reducing processing overhead at the receiving device. Further, flushing older packets from the baseband queue and replacing them with newer packets in accordance with some example embodiments can avoid a receiving apparatus calculating an RTT that does not reflect post-stall network conditions. As such, some example embodiments can avoid triggering rate control mechanisms that may result in needlessly performing a rapid ramp down and slow ramp up of a streaming rate. Users can accordingly benefit by a faster recovery of transmission rate following a stall condition. Moreover, network operators can benefit from such example embodiments due to a reduced amount of data being transmitted over the network.

Figure 1:
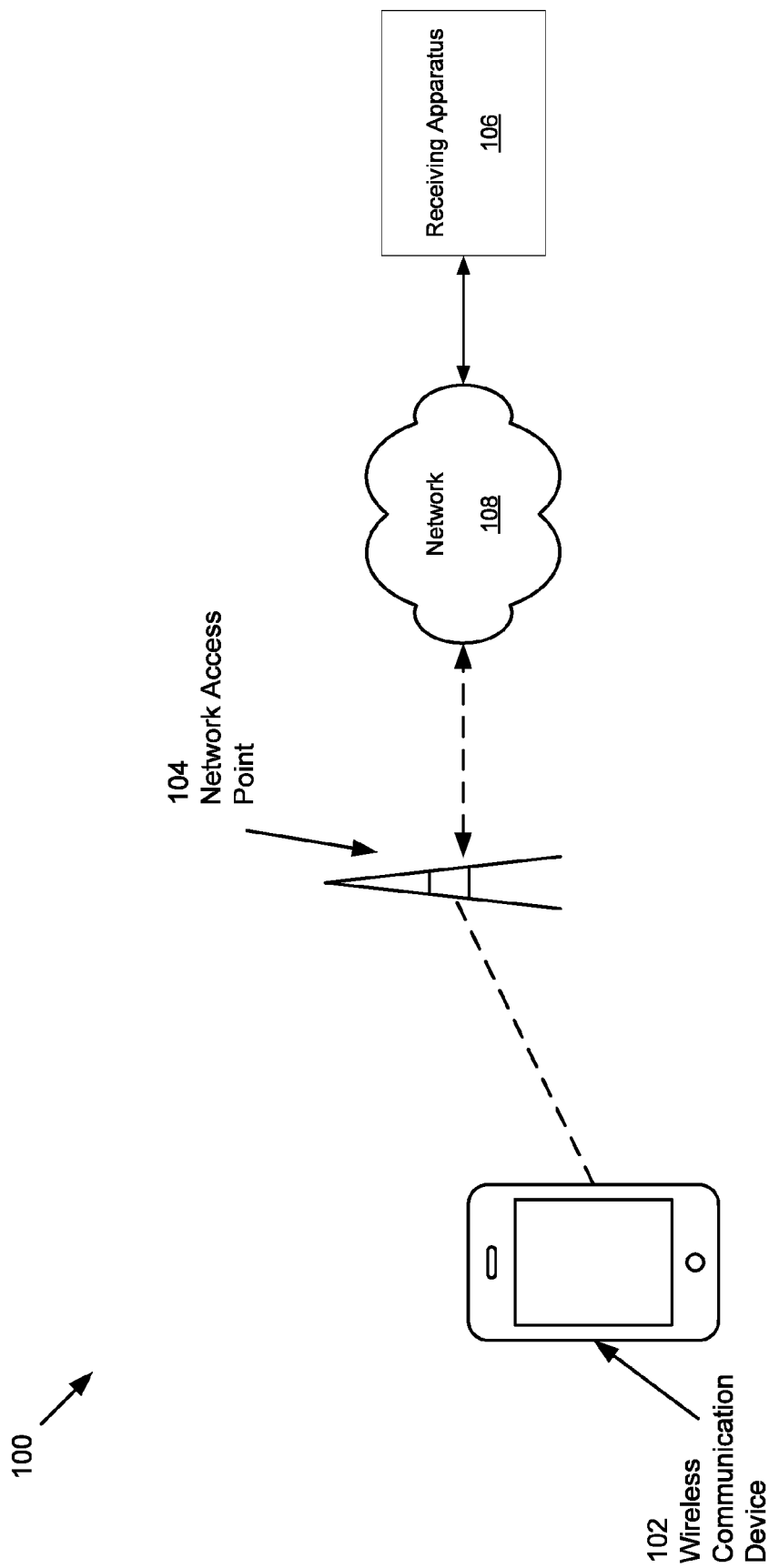
FIG. 1 illustrates a wireless communication system including a wireless communication device in accordance with some example embodiments.

FIG. 1 illustrates a wireless communication system 100 including a wireless communication device 102 in accordance with some example embodiments. The wireless communication device 102 can, for example, be a cellular phone, such as a smart phone device, a tablet computing device, a laptop computing device, or other computing device that can be configured to wirelessly access a network and operate within the wireless communication system 100.

The wireless communication device 102 can be configured to wirelessly access a network, such as the network 108, via one or more network access points 104. A network access point 104 can, for example, be a cellular base station, such as, by way of non-limiting example, a base transceiver station (BTS), a node B, an evolved node B (eNB), femtocell, or other type of cellular base station. As a further example, a network access point 104 can be embodied as a wireless local area network (WLAN) access point, such as a wireless router, wireless bridge, and/or other type of access point that can be used to access a WLAN. In some embodiments, wireless communication system 100 can include a plurality of network access points 104, which can be of a variety of types (e.g., a mixture of multiple types of cellular base stations, a mixture of one or more types of cellular base stations and one or more WLAN access points, or the like). It will be appreciated, however, that the foregoing example embodiments of the network access point 104 are non-limiting, and that the embodiment of the wireless network access point 104 can vary depending on a type of radio access technology (RAT) used for communication between the wireless communication device 102 and network access point 104.

The wireless communication device 102 can be configured to use any present or future developed RAT to wirelessly access a network, such as network 108, via a wireless network access point, such as wireless network access point 104. In some example embodiments, the wireless communication device 102 can be a multi-mode device, which can be configured to access a network via multiple RATs.

For example, in some embodiments, such as in some embodiments in which wireless network access point 104 is embodied as a cellular base station, the wireless communication device 102 can be configured to use a cellular RAT to access a network. For example, in some embodiments, the wireless communication device 102 can be configured to use a fourth generation (4G) cellular RAT, such as a Long Term Evolution (LTE) RAT, including LTE, LTE-Advanced (LTE-A), and/or the like to access a network. As another example, in some embodiments, the wireless communication device 102 can be configured to use a third generation (3G) RAT, such as a Universal Mobile Telecommunications System (UMTS) RAT, such as Wideband Code Division Multiple Access (WCDMA) or Time Division Synchronous Code Division Multiple Access (TD-SCDMA); a CDMA2000 RAT (e.g., 1xRTT) or other RAT standardized by the Third Generation Partnership Project 2 (3GPP2); and/or other 3G RAT to access a network. As a further example, in some embodiments, the wireless communication device 102 can be configured to use a second generation (2G) RAT, such as a Global System for Mobile Communications (GSM) RAT, and/or other 2G RAT to access a network. It will be appreciated, however, that the foregoing examples of cellular RATs are provided by way of example, and not by way of limitation. In this regard, other present or future developed cellular RATs, including various fifth generation (5G) RATs now in development, can be used by the wireless communication device 102 to access a network within the scope of the disclosure.

In some example embodiments, the wireless communication device 102 can additionally or alternatively be configured to access a network via a non-cellular RAT. For example, in some embodiments, such as some embodiments in which wireless network access point 104 is embodied as a WLAN access point, a WLAN RAT, such as an Institute of Electrical and Electronics Engineers (IEEE) standardized Wi-Fi RAT (e.g., IEEE 802.11 a/b/g/n/ac/ad/etc.), can be used by the wireless communication device 102 to access a network.

The wireless communication device 102 can be configured to communicate with one or more remote devices via a wireless network connection. For example, in some embodiments, the wireless communication device 102 can be configured to communicate with the receiving apparatus 106 via the network 108. The network 108 can be any network that can be accessed via network access point 104 and that can support communication between two or more devices, such as the wireless communication device 102 and the receiving apparatus 106. By way of non-limiting example, network 108 can include can include one or more wireless networks (e.g., one or more cellular networks, one or more WLANs, and/or the like), one or more wireline networks, or some combination thereof, and, in some example embodiments, can include the Internet The receiving apparatus 106 can be any computing device that can receive media data that can be streamed by the wireless communication device 102. In some example embodiments, the receiving apparatus 106 can be a second wireless communication device 102.

In some example embodiments, the wireless communication device 102 can be configured to engage in a streaming media session and stream media data, such as audio data, video data, a combination of audio and video data, and/or other data that can be streamed over a network, such as the network 108, to one or more remote devices, such as the receiving apparatus 106. For example, the wireless communication device 102 of some example embodiments can have a media streaming application implemented thereon, which can be configured to transmit media data, such as media packets, for a streaming media session via a wireless communication link to network access point 104 to the receiving apparatus 106 over the network 108. The media streaming application can be any application that can stream media data, such as audio, video, or some combination thereof to one or more receiving devices. By way of non-limiting example, the media streaming application can be a video call or video conferencing application, such as Apple® Inc.'s FaceTime®. Media data that can be streamed by the wireless communication device 102 during a streaming media session can, for example, include real time media and/or non-real time media.

In some example embodiments, a streaming media session can include streaming of data in a single direction, such as from wireless communication device 102 to the receiving apparatus 106 during a streaming media session. However, in some example embodiments, a streaming media session can include multi-directional data streaming in which media data can be streamed from the wireless communication device 102 to one or more receiving apparatuses 106 and from one or more receiving apparatuses 106 to the wireless communication device 102. For example, multi-directional data streaming can be used in some example embodiments to support real time video calls, conference calls, and/or the like.

Figure 2:
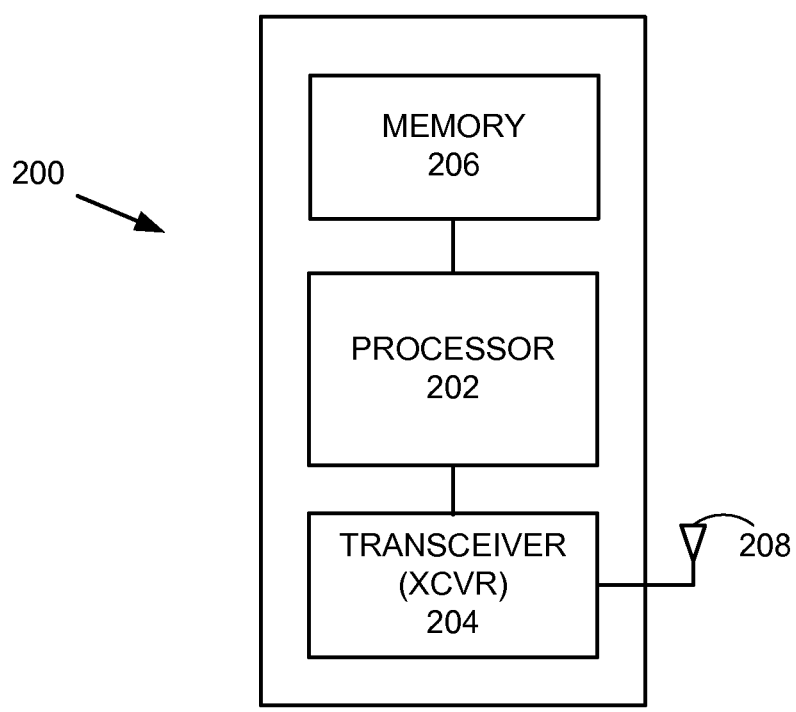
FIG. 2 illustrates a block diagram of an example apparatus that can be implemented on a wireless communication device in accordance with some example embodiments.

FIG. 2 illustrates a block diagram of an example apparatus 200 that can be implemented on a wireless communication device, such as wireless communication device 102, in accordance with some example embodiments. The apparatus 200 can include a processor 202 coupled with memory 206 and also coupled with a wireless transceiver(s) 204. Processor 202 can be configured to read, write and execute processor instructions stored in memory 206. Processor 202 can also be configured to control wireless transceiver(s) 204. In some embodiments, wireless transceiver 204 can connect to wireless networks, via a network access point 104. Accordingly, in some such example embodiments, the wireless transceiver 204 can be configured to enable transmission of media packets and/or other media data that can be streamed in a streaming media session to a receiving apparatus 106 over a wireless channel (e.g., a wireless channel between the wireless communication device 102 and network access point 104). For example, in embodiments in which a network access point 104 is a cellular base station, media packets can be transmitted by the transceiver 204 and streamed over a cellular channel.

Figure 3:
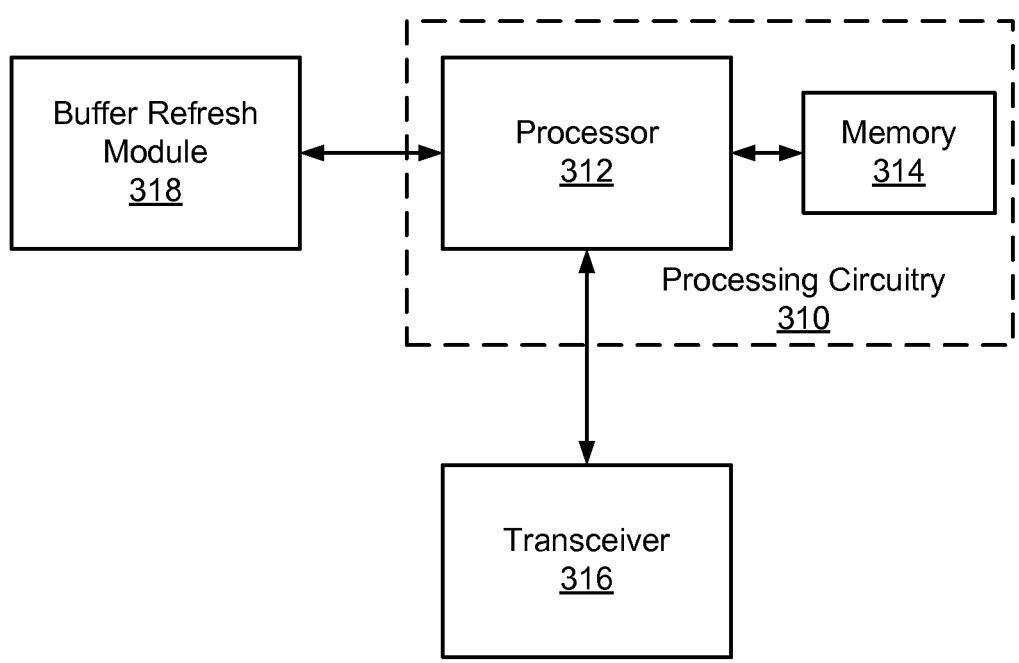
FIG. 3 illustrates a block diagram of another example apparatus that can be implemented on a wireless communication device in accordance with some example embodiments.

FIG. 3 illustrates a block diagram of another example apparatus that can be implemented on a wireless communication device, such as wireless communication device 102, in accordance with some embodiments. In this regard, FIG. 3 illustrates an apparatus 300 that can, when implemented on a computing device, such as wireless communication device 102, enable the computing device to operate within the system 100 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of a wireless communication device in accordance with various example embodiments, and thus can provide means for performing functionalities of wireless communication device 102 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 100 when implemented on or otherwise operably coupled to the computing device. For example, in some embodiments, one or more components of the apparatus 300 can provide baseband circuitry that can be configured to enable a computing device, such as wireless communication device 102, to access and communicate over a wireless network using one or more RATs In some example embodiments, the processing circuitry 310 can include a processor 312 and, in some embodiments, such as that illustrated in FIG. 3, can further include memory 314. The processor 312 can, for example, be an embodiment of the processor 202. The memory 314 can, for example, be an embodiment of the memory 206. As such, in some example embodiments, the processing circuitry 310 can be at least partially embodied by the processor 202 and/or memory 206. The processing circuitry 310 can be in communication with, control, and/or otherwise be coupled with a transceiver 316 and/or buffer refresh module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of a communication device as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver 316, or buffer refresh module 318 via a bus (or buses) for passing information among components of the apparatus 300.

The apparatus 300 can further include one or more transceivers 316. The transceiver 316 can, for example, be an embodiment of the transceiver 204. The transceiver 316 can be configured to enable the apparatus 300 to send (e.g., transmit) wireless signals to and receive wireless signals from a wireless network via a connection to a wireless network access point, such as the wireless network access point 104. As such, the transceiver 316 can be configured to support any type of RAT that may be used to support communication over a wireless channel between a wireless communication device and a network. Thus, for example, the transceiver 316 can be configured to support communication via any type of RAT that can be used for communication between the wireless communication device 102 and a wireless network access point 104.

The apparatus 300 can further include buffer refresh module 318. The buffer refresh module 318 can be embodied as various means, such as circuitry, hardware, a computer program product comprising a computer readable medium (for example, the memory 314) storing computer readable program instructions that are executable by a processing device (for example, the processor 312), or some combination thereof. The buffer refresh module 318 can be configured to control flushing and replenishing a baseband queue, such as the baseband queue 408 illustrated in and described below with respect to FIG. 4, to refresh blocked media packets during a stall condition in accordance with one or more example embodiments disclosed herein.

Figure 4:
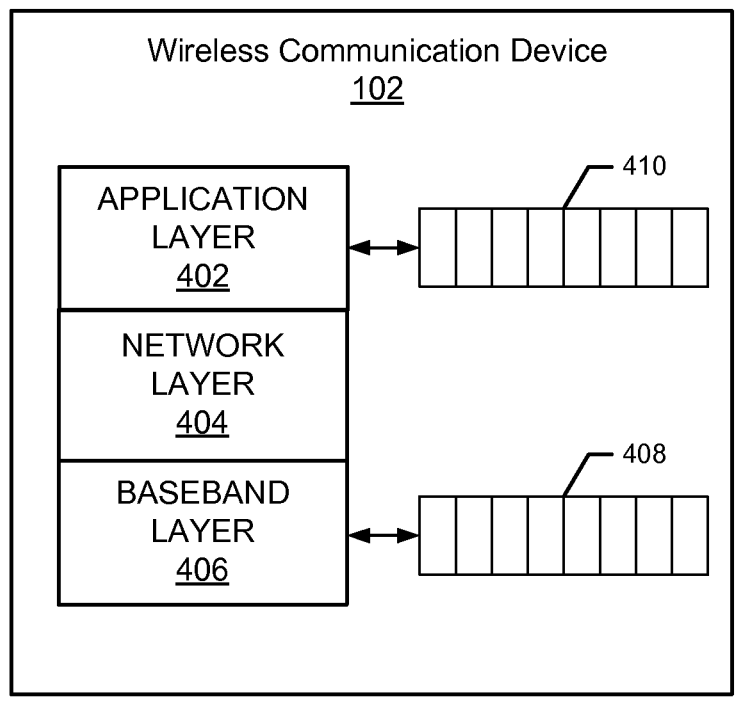
FIG. 4 illustrates a block diagram of system layers that can operate in a wireless communication device in support of a streaming media session in accordance with some example embodiments.

FIG. 4 illustrates a block diagram of system layers that can operate in a wireless communication device in support of a streaming media session in accordance with some example embodiments. These layers can include an application layer 402 and a baseband layer 406. The layers can additionally include one or more intermediate system layers, such as network layer 404, which can be disposed between the application layer 402 and the baseband layer 406 within the system layer hierarchy. In some embodiments including a network layer 404 and/or other intermediate layer, the intermediate layer(s) can be at least partially implemented by a processor that can be included in the processor 202, processing circuitry 310 and/or processor 312.

Application layer 402 can correspond to the media streaming application. For example, in embodiments in which the wireless communication device 102 has a video conferencing application, such as FaceTime® or other video conferencing application that can be configured to support a video call between two or more devices (e.g., wireless communication device 102 and one or more receiving apparatuses 106) implemented thereon, the application layer 402 can correspond to the video conferencing application. In some example embodiments, the application layer 402 can be at least partially implemented by an application processor and/or or host processor that can be included in the processor 202, processing circuitry 310 and/or processor 312.

In some example embodiments, the baseband layer 406 can be at least partially implemented by a baseband processor that can be included in the processor 202, processing circuitry 310 and/or processor 312. In some example embodiments, the baseband layer 406 can further include physical communication hardware, such as the transceiver 204 and/or transceiver 316 that can be configured to send and/or receive data over a wireless network. The baseband layer 406 of some example embodiments can include multiple sub-layers, such as a media access control (MAC) layer and a physical (PHY) layer. The baseband layer 406 of some example embodiments can be configured to convert packet data to be transmitted by the wireless communication device 102 (e.g., packets queued for transmission in the baseband queue 408) into a bit stream for transmission over a link (e.g., a physical layer link) between the wireless communication device 102 and the network access point 104.

The application layer 402 and baseband layer 406 can be configured to communicate with each other. In this regard, for example, the application layer 402 and baseband layer 406 can communicate by passing data to each other via one or more intermediate layers, such as network layer 404. Additionally or alternatively, in some example embodiments, application layer 402 can send data to the baseband layer 406 and/or baseband layer 406 can send data to the application layer 402 via a communication path that can bypass network layer 404 and/or one or more further intermediate system layers that can be disposed between the application layer 402 and the baseband layer 406.

In some embodiments, application layer 402 can generate media packets and/or other media data units for streaming in a streaming media session. The generated media data can, for example, include audio packets, video packets, and/or packets containing both audio and video data. The generated media data can, for example, include real time media data in embodiments in which the streaming media session is a real time streaming media session. Additionally or alternatively, the generated media data can include non-real time media data. The application layer 402 can provide the generated media data to the baseband layer 406, which can control transmission of the media packets over the wireless channel.

Media packets received by the baseband layer 406 from the application layer 602 can be at least temporarily stored in the baseband queue 408 prior to transmission from the wireless communication device 102. The baseband layer 406 can provide feedback to the application layer 402. The feedback can include queue status information for the baseband queue 408. The queue status information can, for example, include an indication of how many bytes are in the queue, how many media packets are in the queue, how many bytes have been sent, how many media packets have been sent, which media packets are in the queue, which media packets have been sent, and/or other information.

The application layer 402 can be configured to calculate a transmission rate for the streaming media session based on queue status information that can be provided by the baseband layer 406. Further, the application layer 402 can determine an occurrence of a stall condition based on a calculated transmission rate and/or otherwise on the basis of queue status information that can be received from the baseband layer 406. A stall condition can, for example, be a stall in transmission of media packets from the baseband queue 408 for some period of time. As another example, a stall condition can be an imbalance condition in which the application layer 402 can be generating media packets at a faster rate than they are being transmitted from the baseband queue 408.

In some example embodiments, the application layer 402 can maintain a buffer 410 of at least a portion of media packets provided by the application layer 402 to the baseband layer 406 for transmission. The buffer 410 can, for example, be implemented as a linked list. The amount of media packets maintained in the buffer 410 can vary by embodiment. In some example embodiments, the amount of media packets maintained in the buffer 410 can be an amount of media packets corresponding to a threshold minimum amount of packets to be maintained in the baseband queue 408. In this regard, some example embodiments can maintain a threshold minimum amount of packets in the baseband queue 408 that can be sufficient to support recovery to a target streaming rate following recovery from a stall condition. As such, in some embodiments, the buffer 410 can be used to maintain copies of a number of media packets sufficient to satisfy the threshold minimum number of packets to be maintained in the baseband queue 408 to enable replenishing the baseband queue 408 in accordance with some example embodiments. For example, in some embodiments having a threshold minimum number of packets to be kept in the baseband queue 408, the threshold minimum number can correspond to a number of media packets containing a threshold minimum playback length of media data, such as, by way of non-limiting example, a threshold minimum playback length ranging between 1 and 2 seconds worth of media data. In some example embodiments, the media packets most recently provided to the baseband layer 406 can be maintained in the buffer 410. For example, in some embodiments in which up to an integer, n, media packets (e.g., an integer value equal to a threshold minimum number of packet to be kept in the baseband queue 408) are maintained in the buffer 410, the media packets maintained in the buffer 410 can be the last n media packets provided to the baseband layer 406.

The baseband queue 408 and the buffer 410 can each be implemented in memory, such as, by way of non-limiting example, random access memory (RAM), which can be included in memory 206 and/or memory 314. In some example embodiments the baseband queue 408 and the buffer 410 can be maintained in the same physical memory. In some such example embodiments, a baseband processor that can be associated with the baseband layer 406 and a host or application processor that can be associated with the application layer 402 can have access to and store data in the same physical memory, although potentially different portions of the physical memory. Alternatively, in some example embodiments the baseband queue 408 and buffer 410 can be maintained in separate physical memories. For example, in some embodiments in which the baseband queue 408 and buffer 410 are maintained in separate memories, a baseband processor that can be associated with the baseband layer 406 can have its own dedicated memory, such as on-board memory (e.g., on-board RAM), and can use the dedicated memory to maintain the baseband queue 408, while a host processor and/or application processor that can be associated with the application layer 402 can maintain the buffer 410 in a system memory.

In some example embodiments, the application layer 402 can continue to generate new media packets during a stall condition in accordance with some example embodiments rather than ceasing to generate new media packets during a stall condition. In this regard, new media packets can constitute media packets that have not yet been provided to the baseband layer 406 for transmission in the streaming media session, and thus, which have not been queued in the baseband queue 408.

In some example embodiments, contents of the baseband queue 408 can be flushed during a stall condition. In this regard, at least a portion of media packets queued in the baseband queue 408 can be flushed (e.g., removed) from the baseband queue 408. Flushing the baseband queue 408 can, for example, be performed by the baseband layer 406 based on logic that can be implemented in the baseband layer 406. As another example, flushing of the baseband queue 408 can be performed in response to a command that can be provided by the application layer 402 in response to a stall condition.

After the baseband queue 408 has been flushed, the application layer 402 can replenish the baseband queue 408 by providing a portion (e.g., a subset) of the media packets maintained in the buffer 410 and providing one or more new media packets that have been generated during the stall condition and that were not previously provided to the baseband layer 406. In some example embodiments, replenishing the baseband queue 408 can include providing enough total media packets to the baseband layer 406 to satisfy a threshold minimum number of packets to be maintained in the baseband queue 408. For example, in some embodiments, the threshold minimum amount of packets can be a number of packets sufficient to support a target streaming rate for the streaming media session, such as a number sufficient to support recovery to the target streaming rate following recovery from the stall condition. One or more oldest media packets that were flushed from the baseband queue 408 may not provided again to the baseband layer 406, but rather can be replaced by one or more new media packets that were not previously provided to the baseband layer 406. Accordingly, older packets can be flushed from the baseband queue 408 and replaced with newer packets such that when the wireless data interface recovers from the stall condition, the wireless communication device 102 can avoid sending old packets that were blocked in the baseband queue 408 by the stall to the receiving apparatus 106.

In some example embodiments, the baseband layer 406 can provide feedback information to the application layer 402 regarding flushing of the baseband queue 408. In this regard, the baseband layer 406 can inform the application layer 402 which packets were flushed and/or that will be flushed out of the baseband queue 408. In some example embodiments, the application layer 402 can further determine which media packets have already been transmitted over the wireless channel from feedback information that can be provided by the baseband layer 406. The application layer 402 can use the feedback information to select which packets from the buffer 410 to provide to the baseband layer 406 to replenish the baseband queue 408.

In some example embodiments, flushing and replenishing of the baseband queue 408 can be performed multiple times, such as periodically, during a stall condition. The frequency with which flushing and replenishing can be performed can vary by embodiment. By way of non-limiting example, flushing and replenishing of the baseband queue 408 can be performed approximately every second during a stall condition in some embodiments.

In some example embodiments, one or more new media packets generated during a stall condition and prior to and/or between flushing operations can be provided to the baseband layer and added to the application layer buffer without waiting for the next flushing operation. In this regard, in some example embodiments, new media packets generated during a stall condition that can be provided to the baseband layer for addition to the baseband queue without overlapping with a flush operation can be provided to the baseband layer and queued in the baseband queue without waiting for the next flush and replenish operation. As such, in some instances, there may not be any new media packets that have not been previously provided to the baseband layer to provide the baseband layer when replenishing the baseband queue after the baseband queue has been flushed.

For example, assuming a stall condition exists at time t, the wireless communication device 102 of some example embodiments can determine to flush the baseband queue 408, and can stop providing newly generated media packets from the baseband layer 406 until flushing of the baseband queue 408 has been completed. The application layer 402 can receive feedback information regarding the flushing at time t+alpha. The application layer 402 can use this feedback information to select the buffered media packets from the buffer 410 to resend to the baseband layer 406. These selected packets can be provided to the baseband layer 406 to replenish the baseband queue 408. Additionally, any new media packets generated in the time range [t, t+alpha] can also be provided to the baseband layer 406 for the first time. The number of such new media packets can depend on the length of the latency time from time t to time t+alpha. As such, in some instances, there may not be any new media packets to provide to the baseband layer 406 when replenishing the baseband queue 408 following a flush operation.

Figure 5A:
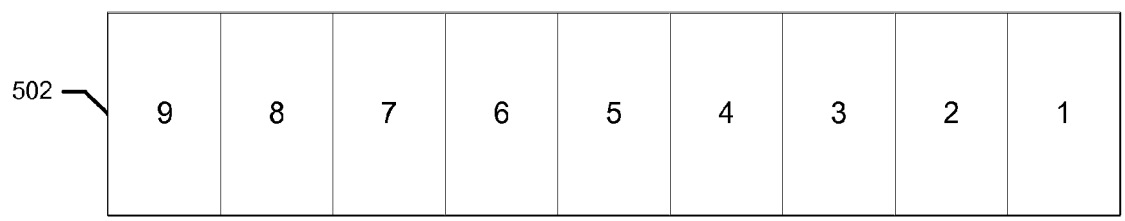
FIGS. 5A and 5B illustrate an example of refreshing blocked media packets in a baseband queue during a stall condition in accordance with some example embodiments.
Figure 5A:
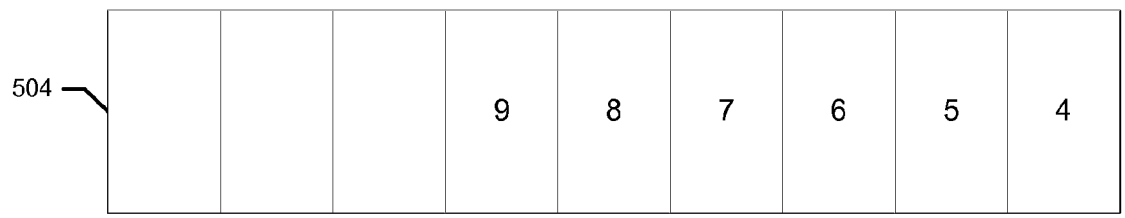
Figure 5B:
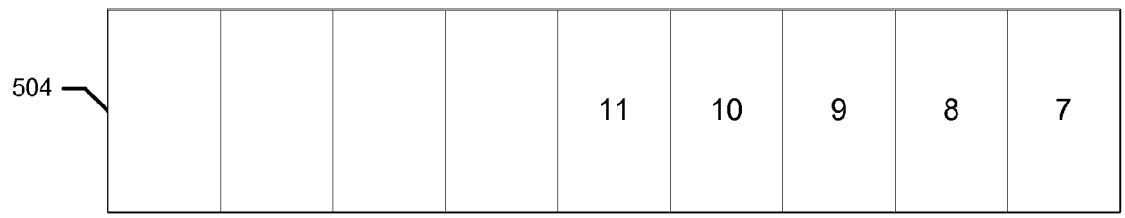

FIGS. 5A and 5B illustrate an example of refreshing blocked media packets in a baseband queue during a stall condition in accordance with some example embodiments. In this regard, FIG. 5A illustrates example initial contents of an application layer buffer 502 and a baseband queue 504 during a stall condition. The application layer buffer can contain media packets 1-9, which can have been previously provided to the baseband layer for transmission in a streaming media session. The baseband queue 504 can include media packets 4-9. In this regard, media packets 1-3 can have already been transmitted and, thus, removed from the baseband queue 504.

In response to the stall condition, the contents of the baseband queue 504 can be flushed. The baseband queue 504 can be replenished with a portion of the media packets contained in the application layer buffer 502 and one or more new media packets that can have been generated during the stall condition. Referring to FIG. 5B, the baseband queue 504 can, for example, be replenished with media packets 7-9 from the buffer 502 and new media packets 10 and 11, which were not previously provided to the baseband layer. For example, the application layer can use feedback information that can be provided by the baseband layer to determine that media packets 4-9 have been flushed from the baseband queue and to determine that media packets 1-3 have already been transmitted in the streaming media session. The application layer can further determine, for example, that media packets 4-6 are too old, or do not otherwise meet a freshness criterion, and should be discarded. Additionally or alternatively, as another example, a minimum threshold number of packets to be maintained in the baseband queue 504 can be 5 media packets, such that media packets 4-6, as the oldest media packets that have not been transmitted and that are not needed to satisfy the 5 media packet minimum, can be discarded without being re-provided to the baseband layer. Accordingly, the application layer can select to provide the baseband layer with only media packets 7-9 from the buffer 502 in addition to new media packets 10 and 11 to replenish the baseband queue 504.

In some example embodiments, the contents of the buffer 502 can be updated to include media packets 10 and 11 and to remove media packets 1-6 after the baseband queue 504 has been replenished. In this regard, in some example embodiments, new media packets generated during a stall condition that are provided to the baseband layer attendant to replenishment of a baseband queue can be added to the application layer buffer. Further, media packets that have already been transmitted and/or older media packets that have been discarded can be removed from the application layer in accordance with some example embodiments.

Figure 6:
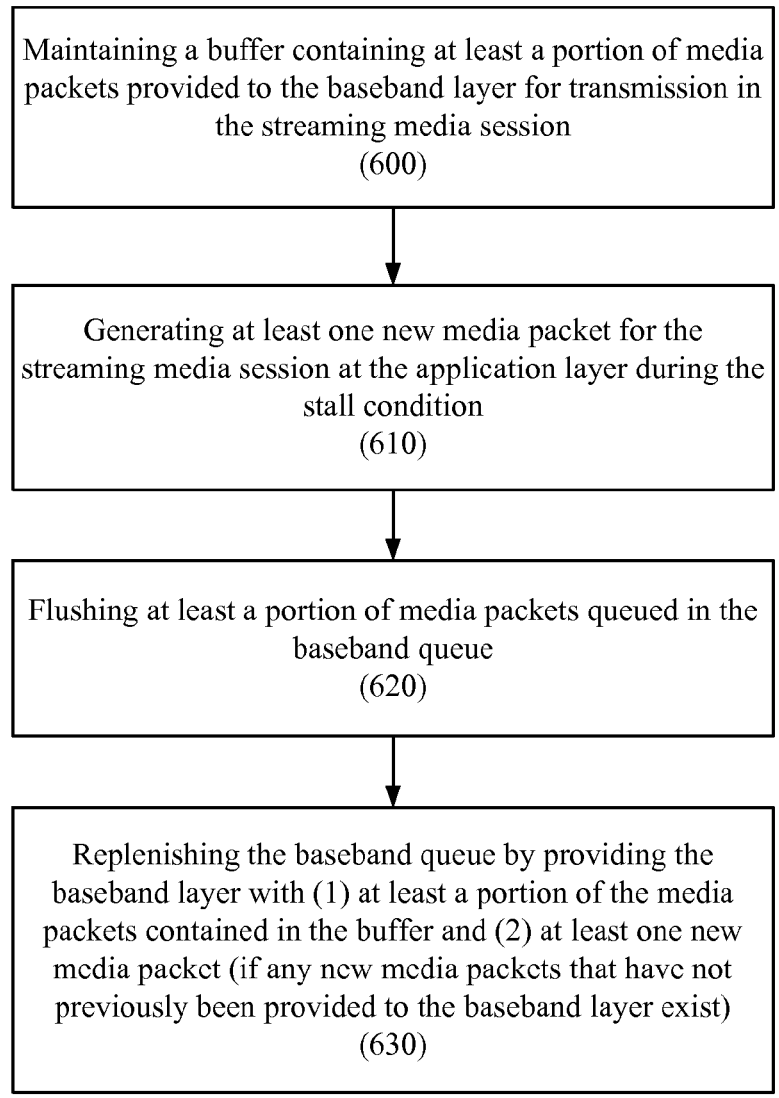
FIG. 6 illustrates a flowchart according to an example method for refreshing blocked media packets for a streaming media session over a wireless network in a stall condition in accordance with some example embodiments.

FIG. 6 illustrates a flowchart according to an example method for refreshing blocked media packets for a streaming media session over a wireless network in a stall condition in accordance with some example embodiments. In this regard, FIG. 6 illustrates operations that can be performed by a wireless communication device, such as wireless communication device 102, participating in a streaming media session in accordance with some example embodiments. One or more of processor 202, transceiver 204, memory 206, processing circuitry 310, processor 312, memory 314, transceiver 316, or buffer refresh module 318 can, for example, provide means for performing one or more of the operations illustrated in and described with respect to FIG. 6.

Operation 600 can include the wireless communication device 102 maintaining a buffer containing at least a portion of media packets provided to a baseband layer, such as the baseband layer 406, for transmission in the streaming media session. In some example embodiments, the media packets contained in the buffer can have been provided to the baseband layer by an application layer, such as the application layer 402. Further, in some example embodiments, the buffer can be a buffer, such as the buffer 410 that can be maintained at the application layer.

The wireless communication device 102 can experience a stall condition during the streaming media session, and can perform one or more of operations 610-630 in response to the stall condition. Operation 610 can include the wireless communication device 102 generating at least one new media packet for the streaming media session at the application layer during the stall condition. In this regard, in some example embodiments, the wireless communication device 102 can continue to generate new media packets during the stall condition rather than discontinuing generation of new media packets during the stall condition.

In some example embodiments, media packets that can be generated attendant to operation 610 can be provided to the baseband layer and queued in the baseband queue provided that a flushing operation is not ongoing. A newly generated media packet that is provided to the baseband layer during the stall condition can also be added to the application layer buffer. However, in such embodiments, if a new media packet is generated during a flushing operation (e.g., during operation 620), the new media packet can be held at the application layer at least until completion of the flushing operation before being provided to the baseband layer during or subsequent to replenishment of the baseband queue in operation 630.

Operation 620 can include the wireless communication device 102 flushing at least a portion of media packets queued in the baseband queue. Operation 630 can include the wireless communication device 102 replenishing the baseband queue by providing the baseband layer with at least a portion of the media packets contained in the buffer. Operation 630 can further include providing the baseband layer with at least one new media packet generated during the stall condition attendant to performance of operation 610 that has not already been provided to the baseband layer. If, however, there are not any new media packets that have been generated during the stall condition and that have not been previously provided to the baseband layer, then operation 630 may not include providing the baseband layer with any new media packets. In some example embodiments, operation 630 can be performed by and/or under the control of the application layer.

Figure 7:
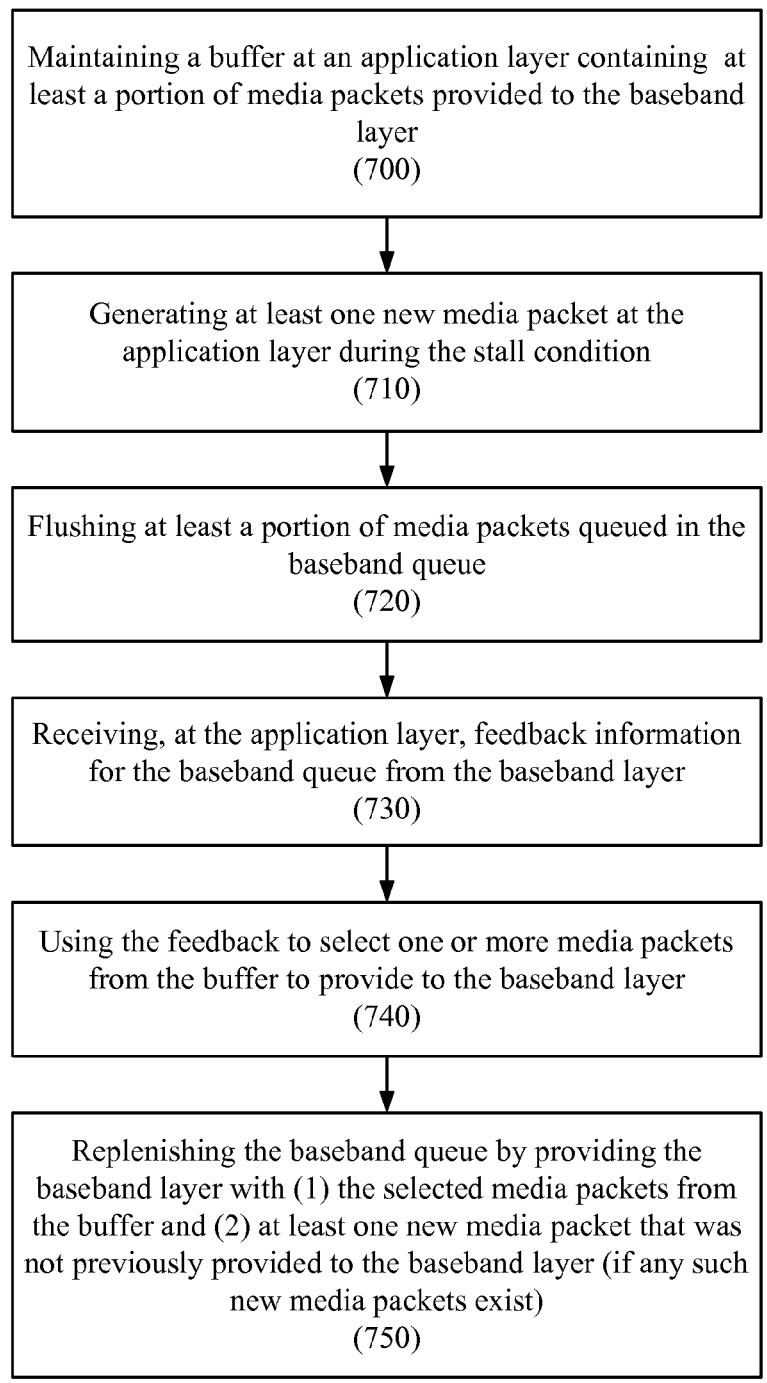
FIG. 7 illustrates a flowchart according to another example method for refreshing blocked media packets for a streaming media session over a wireless network in a stall condition in accordance with some example embodiments.

FIG. 7 illustrates a flowchart according to another example method for refreshing blocked media packets for a streaming media session over a wireless network in a stall condition in accordance with some example embodiments. In this regard, FIG. 7 illustrates an example embodiment of the method of FIG. 6, which can be performed by a wireless communication device, such as wireless communication device 102, participating in a streaming media session in accordance with some example embodiments. For example, one or more operations illustrated in FIG. 7 can be performed by a wireless communication device in response to a stall condition. One or more of processor 202, transceiver 204, memory 206, processing circuitry 310, processor 312, memory 314, transceiver 316, or buffer refresh module 318 can, for example, provide means for performing one or more of the operations illustrated in and described with respect to FIG. 7.

Operation 700 can include maintaining a buffer 410 at the application layer 402 that contains at least a portion of media packets provided to the baseband layer 406 by the application layer 402. In this regard, operation 700 can, for example, correspond to an embodiment of operation 600.

Operation 710 can include generating at least one new media packet (e.g., continuing to generate new media packets) at the application layer 402 during the stall condition. Operation 710 can, for example, correspond to an embodiment of operation 610.

In some example embodiments, media packets that can be generated attendant to operation 710 can be provided to the baseband layer and queued in the baseband queue provided that a flushing operation is not ongoing. A newly generated media packet that is provided to the baseband layer during the stall condition can also be added to the application layer buffer. However, in such embodiments, if a new media packet is generated during a flushing operation (e.g., during operations 720-740), the new media packet can be held at the application layer at least until completion of the flushing operation before being provided to the baseband layer during or subsequent to replenishment of the baseband queue in operation 750.

Operation 720 can include flushing at least a portion of media packets queued in the baseband queue 408. In this regard, operation 720 can include flushing media packets that can be blocked in the baseband queue 408 by the stall condition. Operation 720 can, for example, correspond to an embodiment of operation 620.

Operation 730 can include the application layer 402 receiving feedback information for the baseband queue 408 from the baseband layer 406. The feedback information can, for example, include information from which the application layer 402 can determine which media packets have already been sent over the wireless channel to the receiving apparatus 106 and/or which media packets were (or are going to be) flushed from the baseband queue 408. Operation 740 can include the application layer 402 using the feedback information to select one or more media packets from the buffer 410 to again provide to the baseband layer 406.

Operation 750 can include replenishing the baseband queue 408. In this regard, operation 750 can include the application layer 402 providing the baseband layer 406 with the selected media packet(s) from the buffer 410 (e.g., packets that the application layer 402 can select to provide in operation 740). Operation 750 can further include the application layer 402 providing the baseband layer 406 with one or more new media packets that were not previously provided to the baseband layer 406 (if there are any media packets that were not previously provided to the baseband layer 406). If, however, there are not any new media packets that have been generated during the stall condition and that have not been previously provided to the baseband layer, then operation 750 may not include providing the baseband layer with any new media packets. Operation 750 can, for example, correspond to an embodiment of operation 630 in which packets provided from the buffer 410 can be selected based at least in part on feedback information that can be provided by the baseband layer 406.

Figure 8:
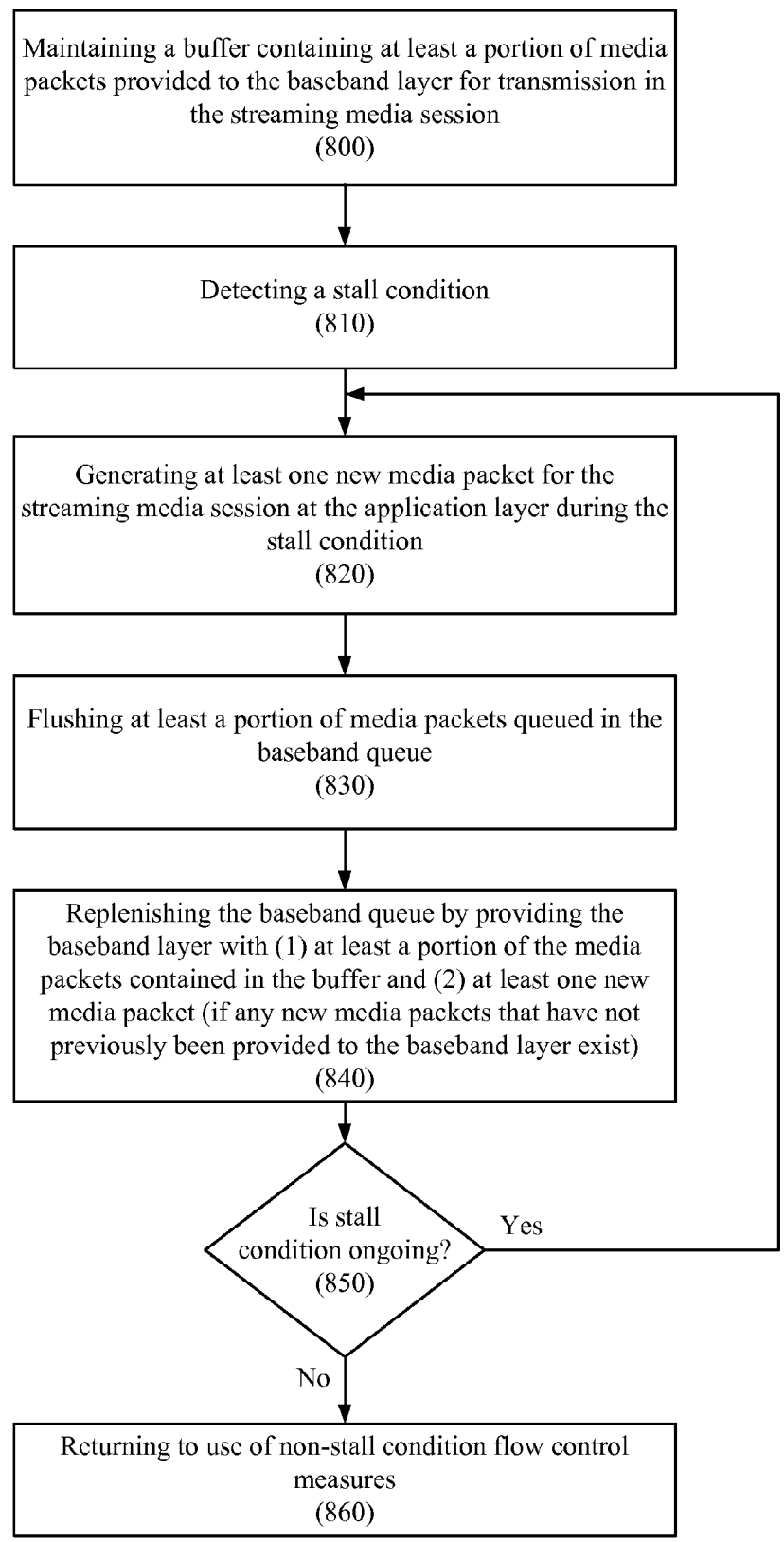
FIG. 8 illustrates a flowchart according to a further example method for refreshing blocked media packets for a streaming media session over a wireless network in a stall condition in accordance with some example embodiments.

FIG. 8 illustrates a flowchart according to a further example method for refreshing blocked media packets for a streaming media session over a wireless network in a stall condition in accordance with some example embodiments. In this regard, FIG. 8 illustrates operations that can be performed by a wireless communication device, such as wireless communication device 102, participating in a streaming media session in accordance with some example embodiments. More particularly, FIG. 8 illustrates an example embodiment of the method illustrated in FIG. 6 in which flushing and replenishing of the baseband queue can be performed multiple times, such as periodically, during a stall condition. One or more of processor 202, transceiver 204, memory 206, processing circuitry 310, processor 312, memory 314, transceiver 316, or buffer refresh module 318 can, for example, provide means for performing one or more of the operations illustrated in and described with respect to FIG. 8.

Operation 800 can include the wireless communication device 102 maintaining a buffer containing at least a portion of media packets provided to a baseband layer, such as the baseband layer 406, for transmission in the streaming media session. In some example embodiments, the media packets contained in the buffer can have been provided to the baseband layer by an application layer, such as the application layer 402. Further, in some example embodiments, the buffer can be a buffer, such as the buffer 410 that can be maintained at the application layer. In this regard, operation 800 can, for example, correspond to an embodiment of operation 600 and/or operation 700.

Operation 810 can include the wireless communication device 102 detecting a stall condition. For example, in some embodiments, operation 810 can be performed by the application layer based on queue status information for the baseband queue (e.g., the baseband queue 408) that can be provided by the baseband layer. One or more of operations 820-850 can be performed in response to the stall condition.

Operation 820 can include the wireless communication device 102 generating at least one new media packet for the streaming media session at the application layer during the stall condition. In this regard, in some example embodiments, the wireless communication device 102 can continue to generate new media packets during the stall condition rather than discontinuing generation of new media packets during the stall condition. Operation 820 can, for example, correspond to an embodiment of operation 610 and/or operation 710.

In some example embodiments, media packets that can be generated attendant to operation 820 can be provided to the baseband layer and queued in the baseband queue provided that a flushing operation is not ongoing. A newly generated media packet that is provided to the baseband layer during the stall condition can also be added to the application layer buffer. However, in such embodiments, if a new media packet is generated during a flushing operation (e.g., during operation 830), the new media packet can be held at the application layer at least until completion of the flushing operation before being provided to the baseband layer during or subsequent to replenishment of the baseband queue in operation 840.

Operation 830 can include the wireless communication device 102 flushing at least a portion of media packets queued in the baseband queue. In this regard, operation 830 can, for example, correspond to an embodiment of operation 620 and/or operation 720.

Operation 840 can include the wireless communication device 102 replenishing the baseband queue by providing the baseband layer with at least a portion of the media packets contained in the buffer. Operation 840 can further include providing the baseband layer with at least one new media packet generated during the stall condition attendant to performance of operation 820 that has not already been provided to the baseband layer. If, however, there are not any new media packets that have been generated during the stall condition and that have not been previously provided to the baseband layer, then operation 840 may not include providing the baseband layer with any new media packets. In some example embodiments, operation 830 can be performed by and/or under the control of the application layer. Operation 840 can, for example, correspond to an embodiment of operation 630 and/or operation 750.

Operation 850 can include the wireless communication device 102 determining whether the stall condition is ongoing. For example, in some embodiments, operation 850 can be performed by the application layer based on queue status information for the baseband queue that can be provided by the baseband layer. As a more particular example, in some example embodiments, operation 850 can include the application layer calculating a transmission rate for the streaming media session and determining whether the stall condition is ongoing based on the calculated transmission rate.

In an instance in which it is determined at operation 850 that the stall condition is ongoing, the method can repeat performance of one or more of operations 820-850. In this regard, in some example embodiments, such as that illustrated in FIG. 8, flushing and replenishment of the baseband queue can be repeated throughout the duration of a stall condition. For example, in some embodiments, operations 830 and 840 can be repeated periodically, such as, by way of non-limiting example, every second during a stall condition.

In some example embodiments in which flushing and replenishment of the baseband queue can be repeated, one or more media packets generated between flushing operations (e.g., between successive performances of operation 830) can be provided to the baseband layer without waiting for the next flush and replenish operation. In this regard, in such example embodiments, media packets generated during a stall condition that can be provided to the baseband layer for addition to the baseband queue without overlapping with a flush operation can be provided to the baseband layer and queued in the baseband queue without waiting for the next flush and replenish operation. Media packets provided to the baseband layer in this manner can be added to the application layer buffer so that they can be again provided to the baseband layer, if desired, following a flushing operation. As such, in some instances, there may not be any new media packets that have not been previously provided to the baseband layer to provide the baseband layer when replenishing the baseband queue after flushing in operation 840.

If, however, it is determined in operation 850 that the wireless communication device 102 has recovered from the stall condition, the method can instead proceed to operation 860, which can include the wireless communication device 102 returning to use of non-stall condition flow control measures. In this regard, operation 860 can include the application layer generating and providing media packets for the streaming media session to the baseband layer in accordance with standard flow control mechanisms that can be implemented in non-stall conditions.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for refreshing blocked media packets for a streaming media session over a wireless network in a stall condition, the method comprising:

at a wireless communication device that implements an application layer and a baseband layer:
maintaining a buffer at the application layer, the buffer containing at least a portion of media packets provided to the baseband layer by the application layer for transmission in the streaming media session, wherein media packets provided to the baseband layer are queued by the baseband layer in a baseband queue prior to transmission;
generating at least one new media packet for the streaming media session at the application layer during the stall condition, wherein a new media packet is a media packet that has not been previously provided to the baseband layer;
flushing at least a portion of media packets queued in the baseband queue; and
replenishing the baseband queue by providing the baseband layer with at least a portion of the media packets contained in the buffer and at least one new media packet of the at least one new media packet generated during the stall condition.

2. The method of claim 1, wherein replenishing the baseband queue comprises providing the baseband layer with a number of media packets sufficient to satisfy a threshold minimum number of packets to be maintained in the baseband queue.

3. The method of claim 2, wherein the threshold minimum number of packets is a number of packets sufficient to support a target streaming rate for the streaming media session.

4. The method of claim 2, wherein maintaining the buffer comprises maintaining a buffer containing up to a number of media packets equivalent to the threshold minimum number of packets, the media packets contained in the buffer being comprised of media packets having been most recently provided to the baseband layer for transmission in the streaming media session.

5. The method of claim 1, further comprising:
receiving, at the application layer, feedback information for the baseband queue, the feedback information being provided by the baseband layer; and
using the feedback information to select the at least a portion of the media packets contained in the buffer to provide to the baseband layer to replenish the baseband queue.

6. The method of claim 1, wherein one or more oldest media packets of the media packets flushed from the baseband queue are not provided to the baseband layer when the baseband queue is replenished.

7. The method of claim 1, wherein the flushing and the replenishing are performed periodically during the stall condition.

8. The method of claim 1, further comprising the wireless communication device:
detecting the stall condition at the application layer based at least in part on queue status information for the baseband queue provided to the application layer by the baseband layer; and
performing the flushing and the replenishing in response to the stall condition.

9. The method of claim 1, wherein flushing at least a portion of media packets queued in the baseband queue comprises the baseband layer flushing the at least a portion of media packets queued in the baseband queue in response to an instruction from the application layer.

10. The method of claim 1, wherein the wireless network comprises a cellular network.

11. A wireless communication device comprising:
a transceiver configured to transmit data and receive data for a streaming media session over a wireless network; and
processing circuitry coupled with the transceiver, the processing circuitry configured to control the wireless communication device to at least:
maintain a buffer at an application layer, the buffer containing at least a portion of media packets provided to a baseband layer by the application layer for transmission in the streaming media session, wherein media packets provided to the baseband layer are queued by the baseband layer in a baseband queue prior to transmission;
generate at least one new media packet for the streaming media session at the application layer during a stall condition, wherein a new media packet is a media packet that has not been previously provided to the baseband layer;
flush at least a portion of media packets queued in the baseband queue; and
replenish the baseband queue by providing the baseband layer with at least a portion of the media packets contained in the buffer and at least one new media packet of the at least one new media packet generated during the stall condition.

12. The wireless communication device of claim 11, wherein the processing circuitry is configured to control the wireless communication device to replenish the baseband queue at least in part by controlling the wireless communication device to provide the baseband layer with a number of media packets sufficient to satisfy a threshold minimum number of packets to be maintained in the baseband queue.

13. The wireless communication device of claim 12, wherein the threshold minimum number of packets is a number of packets sufficient to support a target streaming rate for the streaming media session.

14. The wireless communication device of claim 11, wherein the processing circuitry is further configured to control the wireless communication device to:
receive, at the application layer, feedback information for the baseband queue, the feedback information being provided by the baseband layer; and
use the feedback information to select the at least a portion of the media packets contained in the buffer to provide to the baseband layer to replenish the baseband queue.

15. The wireless communication device of claim 11, wherein one or more oldest media packets of the media packets flushed from the baseband queue are not provided to the baseband layer when the baseband queue is replenished.

16. The wireless communication device of claim 11, wherein the processing circuitry is further configured to control the wireless communication device to flush at least a portion of media packets queued in the baseband queue and replenish the baseband queue multiple times during the stall condition.

17. A computer program product for refreshing blocked media packets for a streaming media session over a wireless network in a stall condition, the computer program product comprising at least one non-transitory computer readable storage medium having computer program code stored thereon, the computer program code comprising program code configured to cause a wireless communication device to:
maintain a buffer at an application layer, the buffer containing at least a portion of media packets provided to a baseband layer by the application layer for transmission in the streaming media session, wherein media packets provided to the baseband layer are queued by the baseband layer in a baseband queue prior to transmission;

generate at least one new media packet for the streaming media session at the application layer during the stall condition, wherein a new media packet is a media packet that has not been previously provided to the baseband layer;

flush at least a portion of media packets queued in the baseband queue; and replenish the baseband queue by providing the baseband layer with at least a portion of the media packets contained in the buffer and at least one new media packet of the at least one new media packet generated during the stall condition.

18. The computer program product of claim 17, wherein the computer program code comprises program code configured to cause the wireless communication device to replenish the baseband queue at least in part by causing the wireless communication device to provide the baseband layer with a number of media packets sufficient to satisfy a threshold minimum number of packets to be maintained in the baseband queue.

19. The computer program product of claim 17, wherein one or more oldest media packets of the media packets flushed from the baseband queue are not provided to the baseband layer when the baseband queue is replenished.

20. The computer program product of claim 17, wherein the computer program code further comprises program code configured to cause the wireless communication device to flush at least a portion of media packets queued in the baseband queue and replenish the baseband queue multiple times during the stall condition.

\* \* \* \* \*